United States Patent [19]
Smith

[11] Patent Number: 5,397,817
[45] Date of Patent: Mar. 14, 1995

[54] MOLDING COMPOUNDS HAVING LOW DUROMETER AND HIGH TEAR STRENGTH

[75] Inventor: Robert A. Smith, Clifton Park, N.Y.

[73] Assignee: General Electric Company, Waterford, N.Y.

[21] Appl. No.: 281,316

[22] Filed: Jul. 27, 1994

Related U.S. Application Data

[63] Continuation of Ser. No. 934,591, Aug. 24, 1992, abandoned.

[51] Int. Cl.⁶ .......................... C08K 9/06; C08L 83/04
[52] U.S. Cl. ..................................... 523/213; 524/731; 524/783; 524/789; 524/791; 524/786; 524/860; 524/863
[58] Field of Search ................. 523/213; 524/863, 860, 524/786, 789, 791, 783, 731

[56] References Cited

U.S. PATENT DOCUMENTS 2,938,009  3/1960  Lucas ..................... 260/37
3,635,743  1/1972  Smith ..................... 106/288 Q
3,696,127  10/1972  Matherly ................. 260/375 B
4,782,107  11/1988  Lagarde .................. 524/43.3

FOREIGN PATENT DOCUMENTS 57896    1/1991   Australia.
0071328  2/1983   European Pat. Off.
0235048  9/1987   European Pat. Off.
0410899  1/1991   European Pat. Off.
0457454  11/1991  European Pat. Off.

Primary Examiner—Melvyn I. Marquis
Assistant Examiner—Karen A. Dean

[57] ABSTRACT

Silicone mold compositions are provided which exhibit low durometer and high tear strength properties and comprise a main filler of precipitated silica and a reinforcing co-filler selected from acicular $CaSiO_3$ fillers, fumed aluminum oxide fillers, and spherical ceramic fillers. The co-fillers have large surface areas and small particle sizes. The co-fillers are used with alkoxy silane cross-linking agents of the formula $(RO)_4Si$, particularly n-propylsilicate. Two-part silicone cure systems are provided which enable the rapid achievement of full die B tear strengths without the need for prolonged aging of these materials.

21 Claims, 1 Drawing Sheet

VOL RATIO OF TULLANOX TO ZEOSPHERES AS CO-FILLER

VOL RATIO OF TULLANOX TO ZEOSPHERES AS CO-FILLER

VOLUME RATIO OF TULLANOX TO 10 WOLLASTAKUP AS CO-FILLER

MOLDING COMPOUNDS HAVING LOW DUROMETER AND HIGH TEAR STRENGTH

This a continuation of application Ser. No. 07/934,591, filed on Aug. 24, 1992, now abandoned.

FIELD OF THE INVENTION

The present invention relates to low durometer and high tear silicone compositions useful as silicone molds for molding wax, polyester and polyurethane figurines.

BACKGROUND OF THE INVENTION

In molding statues and novelty items made of wax, polyester and polyurethane, silicone molds are used. Among the desired properties of a silicone mold are low durometer and high tear strength. Materials having these properties are also desired by manufacturers who utilize silicone compounds in printing logos on irregular surfaces, known as so-called Print Blocks.

Manufacturers have tried to provide silicone molds made of compositions exhibiting these properties but have been not been able to manufacture inexpensive, simple formulations for the task.

Attempts to improve the tear strength and durometer of silicones by incorporating fumed silica compounds as the main reinforcing filler have shown only limited success.

SUMMARY OF THE INVENTION

The present invention relates to new silicone compositions for silicone molds which exhibit low durometer and high tear strength. The present invention provides silicone compositions which contain a reinforcing co-filler additive preferably, fumed aluminum oxide, in an amount of between about 0.05 and 25% by weight based on the entire silicone composition.

In one embodiment, the present invention provides a silicone composition having a main filler comprising precipitated silica at up to about 30% by weight in combination with a reinforcing co-filler.

In another embodiment, the present invention provides a silicone composition suitable for use as a silicone mold, which includes a reinforcing co-filler selected from (1) those of acicular morphology, particularly $CaSiO_3$ having an acicular morphology, (2) those of the spherical morphology such as silica-alumina ceramic spheres having a median diameter of between about 1 and 1.5 microns, and (3) fumed metal oxide fillers such as aluminum oxide having an average particle diameter of less than 20 nanometers, and fumed titanium dioxide. These co-fillers are particularly used over the range of 0.05 to 25% by weight based on the entire silicone composition in combination with a precipitated silica main filler.

The present invention also relates to silicone compositions having an alkoxysilane crosslinker of the formula $(RO)_4Si$ at a level of between 0.1 and 15% by weight wherein R is an organic radical having up to about 20 carbon atoms. R may instead represent condensed versions of the $(RO)_4Si$ formula. Preferably, the crosslinker is used in conjunction with a co-filler comprising a fumed aluminum oxide formed from the flame hydrolysis of aluminum chloride. In one embodiment, the crosslinker has the formula $(RO)_4Si$ wherein R is an n-propyl radical.

In one specific embodiment, n-propylsilicate is used as a crosslinker in combination with an aluminum oxide co-filler as described above.

The compositions of the present invention provide novel two-part curable silicone systems which can be used at a 1:1 ratio to produce silicones of low durometer and high tear strength suitable for the molding of wax, polyester and polyurethane into figurines, statues and print blocks.

DETAILED DESCRIPTION OF THE INVENTION

Figure 1:
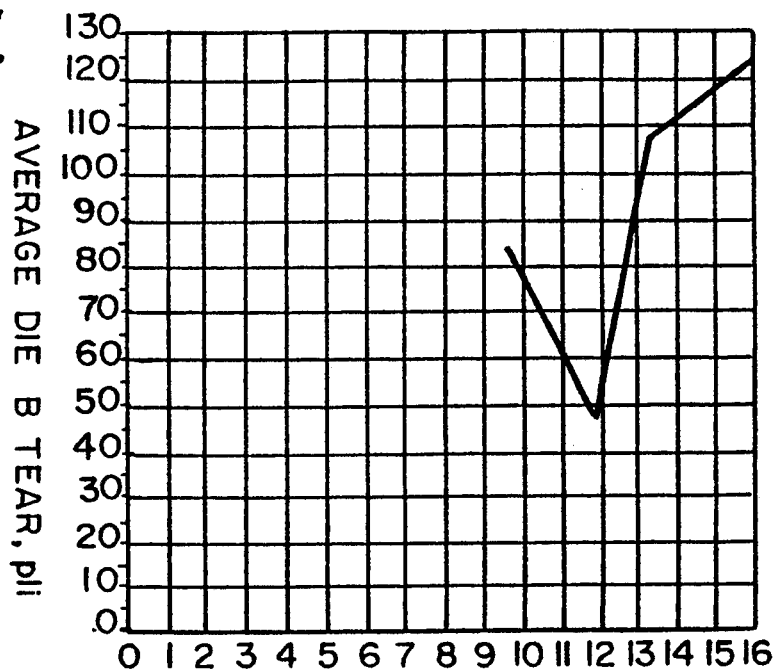
FIGS. 1 and 2 are graphs showing the average tear strength of silicone compositions according to the present invention which contain different ratios of reinforcing fillers.

Silicone compositions in accordance with the mold compositions of the present invention comprise a polymer system, filler, and a catalyst system which contains both a crosslinking agent and a catalyst.

In one group of silicone compositions according to the present invention, blends are formulated which comprise a polymer system containing at least one diorganopolysiloxane fluid having a viscosity of between about 2,000 and about 100,000 centipoise (cps) at 25° C. The fluid or fluids preferably each have a viscosity of between about 20,000 and about 150,000 cps at 25° C. More preferably, mixtures of fluid components are used which mixtures have viscosities of from about 30,000 to about 100,000 cps at 25° C., even more preferably from about 30,000 to about 50,000 cps, and even more preferably from about 35,000 to about 45,000 cps.

The fluid or fluids may be (A) free of silanol groups, and/or (B) silanol-stopped. For purposes of clarification, Components (A)–(B) will be explained in greater detail below.

The polymer systems of the silicone compositions according to the present invention preferably make up from about 40 to about 80% by weight of the entire silicone composition.

Up to 50% by weight of the polymer system may be Component (A), an organopolysiloxane substantially free of silanol and having a viscosity of from about 20 to about 1,000 cps at 25° C. Component (A) may also comprise mixtures of such organopolysiloxanes.

A preferred polymer system comprises up to 100% by weight Component (B), a silanol chain-stopped organopolysiloxane, substantially free of silanol-on-chain and vinyl-on-chain, having a viscosity of from about 20,000 to about 150,000 cps at 25° C. More preferably, component (B) comprises the entire polymer system and includes fluids having viscosities of between about 30,000 and about 120,000 cps at 25° C. Component (B) preferably comprises mixtures of such organopolysiloxanes which mixtures have an overall viscosity of between about 30,000 and about 50,000 cps at 25° C., more preferably about 40,000 cps at 25° C.

In a preferred embodiment, at least one gum of the polymer system is Component (B), and preferably has the structure:

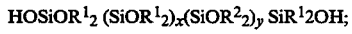

wherein each $R^1$ is independently chosen from monovalent hydrocarbon free radicals free of aliphatic unsaturation and containing 1 to about 8 carbon atoms; each $R^2$ is independently chosen from monovalent hydrocarbon radicals containing 1 to about 8 carbon atoms; and x and y are integers chosen such that the viscosity is about 20,000 to about 150,000 cps at 25°. In other preferred embodiments, x and y are integers chosen such that Component (B) has a viscosity which ranges from about 30,000 to about 120,000 cps at 25° C. and a hydroxyl weight percent in the range from about 0.06 to about 0.14%, preferably from about 0.08 to about 0.11.

The compositions of the present invention may also contain (C) up to about 30% by weight based upon the entire silicone system of a finely divided inorganic filler, preferably a precipitated silica filler. Component (C) preferably comprises from about 5 to about 30% by weight, more preferably from about 15% to about 25%, and even more preferably from about 18% to about 22% by weight precipitated silica filler. The filler (C) may be pretreated or treated in-situ with various agents, for example cyclopolysiloxanes as disclosed in U.S. Pat. No. 2,938,009 to Lucas and silazanes as disclosed in U.S. Pat. No. 3,635,743 to Smith. The cyclopolysiloxanes may be, for example, a cyclotetramethyl siloxane present in the amount of about 15 to 20 weight percent of the filler (C).

Preferred precipitated silica fillers may have a surface area of about 80 $m^2/g$ to about 300 $m^2/g$, preferably about 100 $m^2$/gram to about 300 $m^2$/gram and more preferably about 125 $m^2/g$ to about 240 $m^2/g$. The higher surface area fillers tend to result in better properties, however, they are more expensive than the lower surface area fillers and require surface treatments or more processing aid to incorporate them into the gum.

In order to improve properties or processing, the composition may also contain (D) up to about 10 parts by weight based upon the polymer system of a processing aid comprising low viscosity silanol stopped siloxane fluid of from about 3 to about 500 centipoise at 25° C., or a dimethyl trimethoxy siloxane polymer, or similar compositions such as silanol or methoxy fluids of other viscosities. In one embodiment, Component (D) comprises a polydimethylsiloxane fluid having silanol end stops.

In addition to, in conjunction with, or in place of Component (D), small amounts of hexamethyl disilazane may be used to treat the silica filler prior to mixing the filler with the other components, or in-situ. If used, up to about 20 parts by weight of hexamethyl disilazane is added based on 100 parts of Component (C).

Precipitated silica is used as a main filler in silicone compositions according to the present invention. In one embodiment, the present invention provides a silicone composition having a precipitated silica main filler at up to 30% by weight based on the entire composition, preferably over the range of 5–30% by weight. More preferably, the precipitated silica fillers are used over the range of 15 to 25% by weight and even more preferably from 18 to 22% by weight based on the total weight of the silicone composition. The precipitated fillers show better improvement in certain properties than fumed silica fillers. When reinforcing co-fillers are used in combination with the precipitated silica filler, consistent batches of low durometer, high tear strength silicones are produced.

In a preferred embodiment, finely divided precipitated silica which has been treated with a dimethyl silicone fluid at high temperature to be rendered hydrophobic is used as a main filler. Particularly useful precipitated fillers are Tullanox HM 250D (hexamethyl disilazane (HMDZ)-treated having a pre-treated surface area of 250 $m^2$/gram) from Tullanox of Tulco, Inc., Ayer, Massachusetts, FK 160 Or FK 160 from Degussa, Akron, Ohio, HMDZ-treated Sylox 2 from Davidson Chemical Division, Baltimore, Md., and Dumacil 100 or Dumacil 300 available from Dumar Chemicals, Inc., Milwaukee, Wis. Dumacil 100 has an average surface area of 180 $m^2$/gram and has been treated with a PDMS unreactive oil having tri-methyl end stops and a viscosity of about 50 centistokes (ctks). Dumacil 300 is similarly treated and has an average surface area of 100 to 120 $m^2$/gram and a lower Ph.

In one preferred embodiment, n-propylsilicate is used as a crosslinker in combination with the Tullanox HM 250D main filler described above.

The morphology of the precipitated silica fillers is not as important as the morphology of the reinforcing co-fillers used in accordance with the present invention.

The reinforcing co-fillers of the present invention may be used in combination with a variety of other fillers typically used in silicone compositions having low durometer and high tear strength. The reinforcing fillers used in the present invention are finely divided and morphologically designed.

Inorganic finely divided co-fillers having an acicular morphology are preferred according to the present invention. One preferred acicular filler comprises calcium oxide (CaO) and silica ($SiO_2$). Such a filler has the general formula $CaSiO_3$ and is available, e.g., from NYCO, Willsboro, N.Y., as 10 Wollastokup. 10 Wollastokup is primarily CaO and $SiO_2$ and has a median particle size of about 3 $\mu m$.

Another class of reinforcing co-fillers in accordance with the present invention is spherical fillers. Ceramic spherical fillers are particularly preferred. One such filler is composed of spheres comprising a silica-alumina ceramic. A preferred median particle diameter for applications in accordance with the present invention is between about 1.0 and 1.5 microns ($\mu m$). Zeospheres 200 are available from Zeelan Industries, Inc., St. Paul, Minn. and comprise silica-alumina ceramic spheres having median particle size by population of 1.3 microns.

Preferably, the spherical filler comprises a mixture of ceramic spheres having different diameters. The assortment of diameters enables maximum packing and the spherical morphology provides a lower viscosity and improved flow in compositions containing the filler.

Another class of reinforcing co-fillers useful in lowering durometer and raising tear strength in accordance with the present invention are fillers comprising finely divided fumed aluminum oxide. Fumed AlO fillers are preferably made from the flame hydrolysis of anhydrous aluminum chloride. One such filler which is finely divided is available as Aluminum Oxide-C (AlO—C) from Degussa. AlO—C has an average particle size of 20 nanometers and an average surface area of $100 +/- 15$ $m^2$/gram. AlO—C is particularly preferred as a filler since a two-part silicone in accordance with the present invention can achieve full Die B tear strength immediately upon compounding whereas most compositions must be aged for about a month to achieve full Die B tear.

Another fumed metal oxide co-filler in accordance with the present invention is fumed titanium dioxide. One particular fumed $TiO_2$ is Titandioxid P-25 from Degussa or Titanox 2090 from NL Industries, Highstown, N.J.

The acicular, spherical-ceramic and aluminum oxide fillers described above are used from about 0.05 to about 25% by weight and preferably over the range of 0.05 to about 10% by weight based on the total weight of the silicone composition. More preferably, the co-fillers are used at 0.2 to 5% by weight based on the total weight of the silicone composition, and even more preferably from 0.3 to 1.0% by weight. The co-fillers are preferably used with a main filler comprising precipitated silica.

The catalyst system of the present invention comprises both a crosslinking agent and a catalyst. The agent and catalyst are preferably pre-mixed as a masterbatch before being added to the polymer system. In two-part systems according to the present invention the catalyst system is included in one of the parts whereas the polymer system is included in the other of the two parts. In two-part systems used at a 1:1 ratio an unreactive siloxane oil is mixed with the catalyst system to increase the volume of that part.

Other components may be added to the catalyst system including pigments, a small amount of filler, a vinyl-containing polymer and diluents such as alcohols, particularly n-propyl alcohol.

In a preferred embodiment, the catalyst system comprises a siloxane base component which may comprise from between about 20 and about 60% by weight of the catalyst system. A preferred siloxane base component is vinyl terminated polymer having a viscosity of about 100,000 cps at 25° C.

The alkoxysilane crosslinker of the present invention has the formula $(RO)_4Si$ wherein R is an organic radical having up to about 20 carbon atoms. The crosslinker may alternative be condensed versions of the $(RO)_4Si$ formula. In one embodiment, the crosslinker has the formula $(RO)_4Si$ wherein R is an n-propyl radical.

In one preferred embodiment, the crosslinker is used in conjunction with a co-filler comprising a fumed aluminum oxide formed from the flame hydrolysis of aluminum chloride. In one particularly preferred embodiment, n-propylsilicate is used as a crosslinker in combination with the Aluminum Oxide-C co-filler described above.

The crosslinker is preferably used at a level of between 0.1 and 15% by weight. More preferably, the level of crosslinker is between 1.5 and about 6.0% by weight based on the total weight of the silicone composition and more preferably from about 2.5 and about 4.0% by weight.

The catalyst system preferably comprises a catalytic amount, based on the entire silicone composition, of an organotin catalyst. The catalyst system preferably comprises from about 0.1 to about 1.5% by weight of tin catalyst based on the entire weight of the silicone composition. Preferred tin catalysts to be used in the silicone compositions of the present invention, whether added separately or masterbatched with a crosslinking agent in a catalyst system, include dibutyl tin dilaurate (DBTL), and special paste compositions. A first paste composition, defined herein as paste 1, comprises 27.00% by weight M-stopped PDMS oil having a viscosity of about 10,000 cps at 25° C., 58.00% by weight Novaculite L207A ground quartz (from Malvern Minerals Agent Agsco Corp., Wheeling, Ill.), 10.00% by weight titanium dioxide in the form of Titanox 2090 (from NL Industries), and 5.00% by weight dibutyl tin dilaurate. Two other paste compositions, defined herein as Paste 2 and Paste 3, comprise the components listed below. All components are listed in percentages by weight.

| Component | Paste 2 | Paste 3 |
| --- | --- | --- |
| M-stopped PDMS oil-10,000 cps visc. | 4.69 | 2.69 |
| Novaculite L207A quartz | 10.07 | 5.78 |
| 5 micron Minusil Quartz | 38.79 | 42.52 |
| M-stopped PDMS oil 50 cps viscosity | 42.57 | 46.77 |
| AlO-C alumina | 1.28 | 0.73 |
| Titanium dioxide | 1.74 | 1.00 |
| Dibutyl tin dilaurate | 0.87 | 0.50 |

The paste 2 catalyst was used at 1 part per 1.74 parts polymer system. Paste 3 was used at 1 part per 1 part polymer system.

When DBTL is used as the catalyst it is preferably present in an amount of between about 0.5 and about 1.0% by weight based on the entire weight of the silicone composition, more preferably between about 0.1 and about 1.0% by weight, and even more preferably about 0.5% by weight.

It is believed that the co-fillers described herein affect the properties of durometer and tear by forces generated according to one or more of the following theories. When both a precipitated silica filler and a reinforcing co-filler are used it is believed that the precipitated silica network is favorably reconfigured by 1) electrostatic charges from the co-filler, 2) dipole interactions from the polar alkoxy group of the crosslinker, 3) changes in the rheology due to the addition of either alkoxy silane or co-filler or both that better disperse and control the filler/polymer network, or 4) combinations of these forces.

The compositions of the present invention provide novel two-part curable silicone systems which can be used at a 1:1 ratio to produce silicones of low durometer and high tear strength. In one embodiment a two-part room temperature vulcanizable silicone cure compound comprises a first part containing polymers and fillers and a second part containing catalyst, filler and unreactive silicone oil.

The unreactive oil may be added to increase the volume of the second part until a 1:1 ratio with the first part may be achieved. The unreactive oil is preferably tri-methyl stopped and has a viscosity of between about 10 and 100 centistokes. Polydimethylsiloxane oils having tri-methyl end stops and a viscosity of about 50 centistokes (ctks) are preferred.

In order that those skilled in the art will be better able to practice the invention, the following examples are given by way of illustration and not by way of limitation.

EXAMPLES

To screen a large number of materials, both a hand mixed formula as well as a machine mixed formula were tested. There was no observable difference between the two formulae. The test formulae were of particular commercial interest since they provide a low durometer, high tear compound.

Example I

First, an input base masterbatch was made in a 5 gallon doughmixer and comprised:
  45.20% by weight (A1), a mixture of polydimethylsiloxane (PDMS) silanol stopped polymers having viscosities of 120,000 and 30,000 cps mixed to provide an overall viscosity of 40,000 cps:

20.00% by weight (C1), Tullanox HM250D filler, a hexamethyldisilazane (HMDZ) treated precipitated silica having an average pre-treated particle surface area of about 250 ms/gram;

33.59% by weight (E), a PDMS unreactive oil having tri-methyl end stops and a viscosity of about 50 centistokes (ctks);

0.92% by weight (F), a PDMS silanol-stopped fluid having a viscosity of between 20 and 30 ctks; and 0.30% by weight (G), titanium dioxide having the WERMI designation 06113 (Titanox 2090 from NL Industries).

The masterbatch was then mixed with the components as shown below.

|  | Parts | Input Add Order |
|---|---|---|
| Masterbatch | 68.14 | 1 |
| 5 micron Minusil | 15.19 | 2 |
| Component (E) | 16.67 | 3 |
| Degussa Alumina Oxide-C | 0.50 | 4 |
| Catalyst 1 | 10.00 | 5 |

The Minusil is a typical filler used in silicone compositions and comprises crystalline silicon dioxide having an average particle size of 5 μm. Catalyst 1 substantially comprised n-propylsilicate in a vinyl-stopped oil. The exact composition for Catalyst 1 is as follows:

|  | Percentage by Weight |
|---|---|
| PDMS vinyl terminated polymer having a viscosity of 100,000 cps | 40.0% |
| HMDZ treated Cab-O-Sil MS-7 grade or M7D grade | 5.0% |
| X-1134 Chrome Oxide Green pigment (WERMI 06362) | 1.6% |
| Ferro Corp. F-9279 C.I.Blue Pigment (WERMI 06856), a pigment of the $Co,Al_2O_3,Zn$ type | 2.4% |
| n-propyl silicate (WERMI 06580) -- the x-linker | 35.0% |
| n-propyl alcohol | 6.0% |
| Dibutyl tin Dilaurate (WERMI 0682) | 10.0% |

The Example I test formula was either hand mixed in a paper cup in the add order shown above, or machine mixed. When the formula was machine mixed, the AlO—C was added last and the mixer is labelled Machine.

The physical properties of various compositions results are given below in Table 1, columns A–AB. Column A shows the only experiment to give good tear without AlO—C addition. Other additives or process variables were searched for that would provide immediate and reproducible tears after mixing. In the Examples below, the additive $Al_2O_3$ represents finely divided alumina, the additive Quat 188 is N-(3-chloro-2-hydroxypropyl)trimethyl ammonium chloride at 65% in water, the additive T2909.7 is Huls America's: N(3-trimethyoxysilylpropyl)-N-methyl N,N,-diallylammonium chloride at 50% in methanol, and the additive GMBS is Scotchlike glass bubbles, A16/500, available from 3M Co., Structural Products Department, St. Paul, Minn. The additive (poly-1) comprised the following inputs: 51.72%, 30,000cps PDMS silanol stopped fluid, 17.85% M7D Cab-O-Sil HMDZ-treated, 29.45% M stopped PDMS oil at 50 cps viscosity, and 0.98% silanol stopped 20 to 30 cps oil.

TABLE I-A

| Label | A | B | C |
|---|---|---|---|
| Mixer used: | Hand Mix | Machine | Machine |
| Mix age: | Fresh | 1 day old | 7 days old |
| Temp. of mix: | Rm. Temp. | Rm. Temp. | Rm. Temp. |
| % Catalyst 1: | 10 | 10 | 10 |
| Mold used: | Teflon cast | Teflon cast | Teflon cast |
| Additive: | — | — | — |
| Shore A | 16 | 13 | 14 |
| Ave Tensile Psi | 416 | 339 | 400 |
| Ave Elong % | 334 | 306 | 370 |
| Die B Tear 1) | 116 | 24 | 23 |
| Die B Tear 2) | 111 | 26 | 24 |
| Die B Tear 3) | 131 | 28 | 23 |
| Ave Tear | 119 | 26 | 23 |
| Ave Sheet | — | — | — |
| Thickness Mils | 56 | 71 | 35 |

TABLE I-B

| Label | D | E | F |
|---|---|---|---|
| Mixer used: | Hand Mix | Hand Mix | Hand Mix |
| Mix age: | Fresh | 2 days old | Fresh |
| Temp. of mix: | Cold | Rm. Temp. | Rm. Temp. |
| % Catalyst 1: | 10 | 10 | 8.3 |
| Mold used: | Teflon cast | Teflon cast | Teflon cast |
| Additive: | — | — | — |
| Shore A | 17 | 12 | 8 |
| Ave Tensile Psi | 415 | 360 | 407 |
| Ave Elong % | 339 | 253 | 295 |
| Die B Tear 1) | 28 | 234 | 29 |
| Die B Tear 2) | 29 | 32 | 36 |
| Die B Tear 3) | 30 | 31 | 31 |
| Ave Tear | 29 | 32 | 32 |
| Ave Sheet | — | — | — |
| Thickness Mils | 37 | 37 | 38 |

TABLE I-C

| Label | G | H | I |
|---|---|---|---|
| Mixer used: | Machine | Machine | Hand Mix |
| Mix age: | 8 days old | 8 days old | Fresh |
| Temp. of mix: | Rm. Temp. | Rm. Temp. | Rm. Temp. |
| % Catalyst 1: | 8.3 | 5 | 10 |
| Mold used: | Teflon cast | Teflon cast | Teflon cast |
| Additive: | — | — | Minusil wet-in 8 hours |
| Shore A | 11 | 11 | 14 |
| Ave Tensile Psi | 412 | 376 | 397 |
| Ave Elong % | 317 | 376 | 293 |
| Die B Tear 1) | 24 | 29 | 30 |
| Die B Tear 2) | 27 | 29 | 30 |
| Die B Tear 3) | 26 | 29 | 32 |
| Ave Tear | 26 | 29 | 31 |
| Ave Sheet | — | — | — |
| Thickness Mils | 38 | 68 | 33 |

TABLE I-D

| Label | J | K | L |
|---|---|---|---|
| Mixer used: | Hand Mix | Hand Mix | Hand Mix |
| Mix age: | Fresh | Fresh | Fresh |
| Temp. of mix: | Rm. Temp. | Rm. Temp. | Rm. Temp. |
| % Catalyst 1: | 10 | 10 | 12 |
| Mold used: | 3/8" Cast | Press cure | Teflon cast |
| Additive: | — | — | +0.5% PDMS |
| Shore A | 16 | 17 | 16 |
| Ave Tensile Psi | 372 | 401 | 377 |
| Ave Elong % | 298 | 329 | 301 |
| Die B Tear 1) | 122K | 30 | 27 |
| Die B Tear 2) | 36 | 32 | 27 |
| Die B Tear 3) | 33 | 30 | 28 |
| Ave Tear | 64 | 31 | 27 |
| Ave Sheet | — | — | — |

TABLE I-D-continued

| Label | J | K | L |
|---|---|---|---|
| Thickness Mils | 118 | 71 | 92 |

TABLE I-E

| Label | M | N | O |
|---|---|---|---|
| Mixer used: | Hand Mix | Hand Mix | Hand Mix |
| Mix Age: | Fresh | Fresh | Fresh |
| Temp. of mix: | Rm. Temp. | Rm. Temp. | Rm. Temp. |
| % Catalyst 1: | 10 | 10 | 10 |
| Mold used: | Teflon cast | Teflon cast | Teflon cast |
| Additive: | +0.5% PDMS | +0.5% A10-C | +0.8% GMBS |
| Shore A | 16 | 15 | 17 |
| Ave Tensile Psi | 413 | 371 | 328 |
| Ave Elong % | 318 | 339 | 318 |
| Die B Tear 1) | 27 | 35 | 24 |
| Die B Tear 2) | 29 | 104K | 27 |
| Die B Tear 3) | 28 | 104K | 23 |
| Ave Tear | 28 | 81 | 25 |
| Ave Sheet | — | — | — |
| Thickness Mils | 91 | 82 | 38 |

TABLE I-F

| Label | P | Q | R |
|---|---|---|---|
| Mixer used: | Hand Mix | Hand Mix | Hand Mix |
| Mix age: | Fresh | Fresh | Fresh |
| Temp. of mix: | Rm. Temp. | Rm. Temp. | Rm. Temp. |
| % Catalyst 1: | 10 | 10 | 10 |
| Mold used: | Teflon cast | Press cure | Teflon cast |
| Additive: | $Al_2O_3$ | +0.5% A10-C | +0.5% A10-C |
| Shore A | 13 | 15 | 14 |
| Ave Tensile Psi | 374 | 425 | 412 |
| Ave Elong % | 344 | 333 | 361 |
| Die B Tear 1) | 26 | 38 | 34 |
| Die B Tear 2) | 25 | 121K | 127K |
| Die B Tear 3) | 25 | 125K | 122K |
| Ave Tear | 25 | 95 | 94 |
| Ave Sheet | — | — | — |
| Thickness Mils | 56 | 69 | 56 |

TABLE I-G

| Label | S | T | U |
|---|---|---|---|
| Mixer used: | Machine | Machine | Machine |
| Mix age: | Fresh | Fresh | Fresh |
| Temp. of mix: | Rm. Temp. | Rm. Temp. | Rm. Temp. |
| % Catalyst 1: | 10 | 10 | 10 |
| Mold used: | Press cure | Teflon cast | Teflon cast |
| Additive: | +0.5% A10-C | +0.5% A10-C | +1.0% Quat188 |
| Shore A | 15 | 14 | 13 |
| Ave Tensile Psi | 420 | 437 | 411 |
| Ave Elong % | 359 | 326 | 368 |
| Die B Tear 1) | 130K | 116K | 29 |
| Die B Tear 2) | 127K | 27 | 29 |
| Die B Tear 3) | 117K | 30 | 31 |
| Ave Tear | 125 | 58 | 30 |
| Ave Sheet | — | — | — |
| Thickness Mils | 60 | 32 | 57 |

TABLE I-H

| Label | V | W | X |
|---|---|---|---|
| Mixer used: | Machine | Hand Mix | Hand Mix |
| Mix age: | Fresh | Fresh | Fresh |
| Temp. of mix: | Rm. Temp. | Rm. Temp. | Rm. Temp. |
| % Catalyst 1: | 10 | 10 | 10 |
| Mold used: | Teflon cast | Teflon cast | Teflon cast |
| Additive: | +1% T2909.7 | | |
| Shore A | 16 | 10 | 15 |
| Ave Tensile Psi | 399 | 277 | 390 |
| Ave Elong % | 315 | 303 | 321 |

TABLE I-H-continued

| Label | V | W | X |
|---|---|---|---|
| Die B Tear 1) | 29 | 45K | 33 |
| Die B Tear 2) | 26 | 60K | 30 |
| Die B Tear 3) | 25 | 51K | 32 |
| Ave Tear | 27 | 52 | 32 |
| Ave Sheet | — | — | — |
| Thickness Mils | 53 | 70 | 59 |

TABLE I-I

| Label | Y | Z |
|---|---|---|
| Mixer used: | Machine | Hand Mix |
| Mix age: | Fresh | Fresh |
| Temp. of mix: | Rm. Temp. | Rm. Temp. |
| % Catalyst 1: | 10 | 10 |
| Mold used: | Teflon cast | Teflon cast |
| Additive: | | Poly-1/A10-C |
| Shore A | 12 | 21 |
| Ave Tensile Psi | 415 | 358 |
| Ave Elong % | 335 | 298 |
| Die B Tear 1) | 26 | 26 |
| Die B Tear 2) | 28 | 28 |
| Die B Tear 3) | 37 | 31 |
| Ave Tear | 30 | 28 |
| Ave Sheet | — | — |
| Thickness mils | 38 | 56 |

| Label | AA | AB |
|---|---|---|
| Mixer used: | Machine | Machine |
| Mix age: | 15 months | 15 months |
| Temp. of mix: | Rm. Temp. | Rm. Temp. |
| % Catalyst 1: | 10 | 10 |
| Mold used: | Press cure | Press cure |
| Additive: | +0.5% A10-C | — |
| Shore A | 15 | 15 |
| Ave Tensile Psi | 406 | 443 |
| Ave Elong % | 291 | 322 |
| Die B Tear 1) | — | — |
| Die B Tear 2) | — | — |
| Die B Tear 3) | — | — |
| Ave Tear | 108 | 111 |
| Ave Sheet | — | — |
| Thickness Mils | — | — |

In column Z shown in Table I—I, the M7D-HMDZ treated filler (from Cabot Corp.) in the Poly-1 additive is not responsive to AlO—C as an additive to improve tear. In fact, Table IV-C, column G, shows that Compound III, which contained the M7D-HMDZ treated filler does not contribute to the tear values as well as the Tullanox and AlO—C filler system.

Table II also shows a Two sample T test and is exemplary of the statistically significant effect of using AlO—C as an additive in freshly made base.

Both Tables I and II demonstrate that the addition of AlO—C improves the Die B tear values in freshly made base which is either hand mixed or machine mixed.

TABLE II-A

Formula Type: Machine mixed with no AlO—C

| Specimen No. | Shore A | Tensile, psi | Elong. % | Die B Tear, pli |
|---|---|---|---|---|
| 1 | — | 451 | 385 | 127 |
| 2 | 11 | 442 | 323 | 109 |
| 3 | — | 453 | 326 | 34 |
| 4 | — | 468 | 307 | 120 |
| 5 | 14 | 440 | 328 | 116 |
| 6 | — | 417 | 399 | 49 |
| 7 | — | 425 | 292 | 31 |

TABLE II-A-continued

Formula Type: Machine mixed with no AlO—C

| Specimen No. | Shore A | Tensile, psi | Elong. % | |
|---|---|---|---|---|
| 8 | 14 | 438 | 300 | 132 |
| 9 | — | 406 | 264 | 33 |
| 10 | — | — | — | 29 |
| 11 | 14 | — | — | 122 |
| 12 | — | — | — | 117 |
| 13 | — | — | — | 30 |
| 14 | — | — | — | 35 |
| 15 | — | — | — | 90 |
| No. of Specimens | 4 | 9 | 9 | 15 |
| Mean, m | 13 | 438 | 325 | 78 |
| Standard Dev. s | 15 | 19 | 43 | 44 |

| | | | | Tear, pli |
|---|---|---|---|---|
| Pooled variance | Sp | 19.51 | 35.53 | 31.5 |
| From T Table | T16, 0.05 | 1.746 | 1.746 | — |
| From T Table | T28, 0.05 | — | — | 1.701 |
| Found T | T16, 0.05 | −7.4 | 2.75 | — |
| Found T | T28, 0.05 | — | — | 2.17 |
| Significant | — | Yes | Yes | Yes |

TABLE II-B

Formula Type: Machine Mixed With 0.05% AlO—C

| Specimen No. | Shore A | Tensile psi | Elong. % | Die B tear, pli |
|---|---|---|---|---|
| 1 | — | 402 | 281 | 105 |
| 2 | 15 | 367 | 264 | 117 |
| 3 | — | 358 | 258 | 107 |
| 4 | — | 374 | 276 | 106 |
| 5 | 13 | 381 | 282 | 91 |
| 6 | — | 357 | 336 | 92 |
| 7 | — | 377 | 263 | 98 |
| 8 | 15 | 332 | 251 | 99 |
| 9 | — | 380 | 297 | 104 |
| 10 | — | — | — | 105 |
| 11 | 10 | — | — | 110 |
| 12 | — | — | — | 101 |
| 13 | — | — | — | 106 |
| 14 | — | — | — | 104 |
| 15 | — | — | — | 102 |
| No. of Specimens | 4 | 9 | 9 | 15 |
| Mean, m | 13 | 370 | 279 | 103 |
| Standard Dev. s | 2 | 20 | 26 | 7 |

Table III shows age testing on the two groups of samples from Table II. The samples shown in Table II-A contain no AlO—C additive whereas the samples shown in Table II-B do contain the AlO—C additive.

TABLE III

| | Tensile, psi | Elong % | Die B Tear, pli |
|---|---|---|---|
| *1 Day Age* | | | |
| No. of Observations | 9 | 9 | 15 |
| Sample II-A | | | |
| Mean | 438 | 325 | 78 |
| Stnd. Dev. | 19 | 43 | 44 |
| Sample II-B | | | |
| Mean Base | 370 | 297 | 103 |
| Stnd Dev. for Base | 20 | 26 | 7 |
| SP (Pooled Variance) | 19.51 | 35.53 | 31.5 |
| T16, 95% Conf. Limit | −7.4 | −2.8 | — |
| T28, 95% Conf. Limit | — | — | 2.17 |
| Significance | yes | yes | yes |
| *19 Day Age* | | | |
| No. of Observations | 9 | 9 | 15 |
| Sample II-A | | | |
| Mean | 423 | 293 | 90 |
| Stnd. Dev. | 29.5 | 23.8 | 41.9 |
| Sample II-B | | | |
| Mean Base | 398 | 290 | 101 |
| Stnd Dev. for Base | 70.3 | 45.3 | 34.8 |
| SP (Pooled Variance) | 54.07 | 36.17 | 38.49 |
| T16, 95% Conf. Limit | −0.981 | −0.176 | — |
| T28, 95% Conf. Limit | — | — | 0.783 |
| Significant? | no | no | no |
| *42 Day Age* | | | |
| No. of Observations | 9 | 9 | 15 |
| Sample II-A | | | |
| Mean | 410 | 319 | 42.7 |
| Stnd. Dev. | 44.7 | 51.5 | 2.9 |
| Sample II-B | | | |
| Mean Base | 430 | 323 | 87 |
| Stnd Dev. for Base | 31.7 | 27.7 | 37.2 |
| SP (Pooled Variance) | 38.78 | 41.34 | 26.38 |
| T16, 95% Conf. Limit | 1.09 | 0.24 | — |
| T28, 95% Conf. Limit | — | — | 4.59 |
| Significance | no | no | yes |

Example II

Table IV summarizes the use of aging n-propylsilicate (Wermi 06580) in the Tullanox reinforced masterbatch. Compound II comprises 300 parts of a similar masterbatch designated Masterbatch 2 and having 20% by weight Component (C), and 10.5 parts n-propylsilicate. Compound II was both freshly made as in column D, and aged 2 months before the AlO—C was incorporated into the mix by hand mixing (columns B and C). An improvement in tear values by using the AlO—C along with the n-propylsilicate. Also, the 1:1 A:B cure ratio of Column F shows excellent tear values.

The catalysts below are dibutyl tin dilaurate (DBTL), and Pastes 1, 2 and 3 described above.

Compound III was similar to Compound II except HMDZ-treated fumed silica was used in place of Component (C) and a small bit of titanium dioxide was added.

A "K" after the tear value in lbs./in. means tear was defined as "Knotty". Knotty tears are those that tear at right angles to the cut placed in the rubber.

TABLE IV-A

| Label | A | B | C |
|---|---|---|---|
| Formula: | Compound II | Compound II | Compound II |
| Mix age: | Fresh | Aged 2 mos. | Aged 2 mos. |
| Temp. of mix: | Rm. Temp. | Rm. Temp. | Rm. Temp. |
| % Catalyst: | 0.5% DBTL | Paste 1 | Paste 1 |
| Mold used: | Teflon cast | Teflon cast | Teflon cast |
| Additive: | — | — | +0.4% AlO—C |
| Shore A | 22 | 24 | 18 |
| Ave Tensile Psi | 439 | 549 | 463 |
| Ave Elong % | 309 | 377 | 352 |
| Die B Tear 1) | 151K | 27 | 144K |
| Die B Tear 2) | 47 | 177K | 154K |
| Die B Tear 3) | 50 | 178K | 156K |
| Ave Tear | 83 | 127 | 151 |

TABLE IV-A-continued

| Label | A | B | C |
|---|---|---|---|
| Ave Sheet | — | — | — |
| Thickness Mils | — | 38 | 70 |

TABLE IV-B

| Label | D | E |
|---|---|---|
| Formula: | Compound II | Compound II |
| Mix age: | Freshly made | Freshly made |
| Temp. of mix: | Rm. Temp. | Rm. Temp. |
| % Catalyst: | Paste 1 | Paste 2 |
| Mold used: | Press cure | Teflon cast |
| Additive: | +0.4% A10-C | +0.6% AlO—C |
| Shore A | 21 | 14 |
| Ave Tensile Psi | 521 | 381 |
| Ave Elong % | 392 | 396 |
| Die B Tear 1) | 170K | 99K |
| Die B Tear 2) | 114K | 121K |
| Die B Tear 3) | 152K | 113K |
| Ave Tear | 145 | 111 |
| Ave Sheet | — | — |
| Thickness Mils | 70 | 76 |

TABLE IV-C

| Label | F | G |
|---|---|---|
| Formula: | Compound II | Compound III |
| Mix age: | Freshly made | Freshly made |
| Temp. of mix: | Rm. Temp. | Rm. Temp. |
| % Catalyst: | Paste 3 | 0.5% DBTL |
| Mold used: | Teflon cast | Teflon cast |
| Additive: | +0.4% AlO—C | — |
| Shore A | 7 | 33 |
| Ave Tensile Psi | 360 | 694 |
| Ave Elong % | 520 | 348 |
| Die B Tear 1) | 87K | 41 |
| Die B Tear 2) | 80K | 41 |
| Die B Tear 3) | 91K | 47 |
| Ave Tear | 86 | 43 |
| Ave Sheet | — | — |
| Thickness Mils | 80 | — |

Example III

Figure 2:
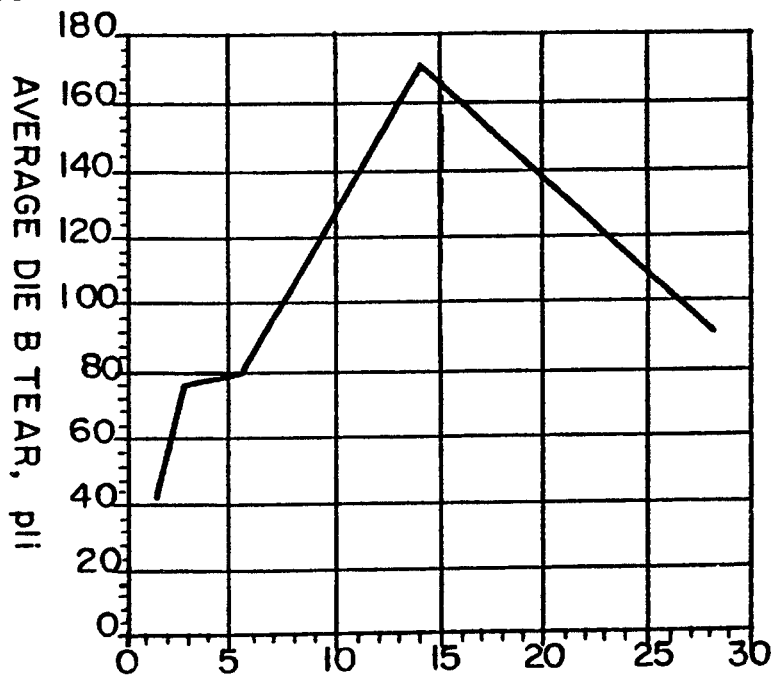

Experiments with 10 Wollastokup 10738 and with Zeospheres 200 as co-fillers are given in the graphs designated FIGS. 1 and 2. These graphs of average Die B Tear values versus ratio of Tullanox to co-filler show the impact of co-filler on tear, again at very low loadings of co-filler. At ratios of around 14:1 Tullanox to 10 Wollastokup, and 15:1 or 16:1 Tullanox to Zeospheres, high tears (>100 pli) are obtained.

Example IV

Table V below shows age testing of a base composition similar to that in Example I with and without an AlO—C additive.

TABLE V-A

| Base Aged | 4 days | 4 days | 4 days | 18 days | 18 days |
|---|---|---|---|---|---|
| % AlO—C | 0 | 0.5 | 0.5 | 0 | 0.5 |
| Shore A | 12 | 14 | 14 | 13 | 10 |
| Tensile, pli | 431 | 407 | 413 | 441 | 356 |
| Elong. % | 354 | 331 | 333 | 341 | 350 |
| Die B Tear, psi | 29 | 34 | 35 | 33 | 99 |

TABLE V-B

| Base Aged | 3 days | 3 days | 16 days | 16 days |
|---|---|---|---|---|
| % AlO—C | 0 | 0.5 | 0 | 0.5 |
| Shore A | 11 | 11 | 10 | 5 |
| Tensile, pli | 346 | 337 | 370 | 312 |
| Elong. % | 296 | 224 | 240 | 362 |
| Die B Tear, psi | 19 | 24 | 22 | 53 |

TABLE V-C

| Base Aged | 7 days | 7 days | 16 days | 16 days |
|---|---|---|---|---|
| % AlO—C | 0 | 0.5 | 0 | 0.5 |
| Shore A | 11 | 11 | 12 | 6 |
| Tensile, pli | 404 | 380 | 412 | 358 |
| Elong. % | 323 | 281 | 279 | 381 |
| Die B Tear, psi | 28 | 30 | 24 | 69 |

Example V

A third masterbatch was formulated to test fumed titanium dioxide as a co-filler. Masterbatch 3 contained the following components:

| Polymer at 40,000 cps (A1) | 45.21% |
|---|---|
| Tullanox Filler (C1) | 20.00% |
| PDMS unreactive oil (E) | 33.87% |
| PDMS silanol stopped fluid (F) | 0.92% |
| Total | 100.00 |

Masterbatch 3 was essentially the same as the masterbatch used in Example 1 except no titanium dioxide (06113) is used in Masterbatch 3. To demonstrate the use of P-25, a material having the components listed below was produced.

| Masterbatch 3 | 67.79 Parts by Weight |
|---|---|
| Water | 0.10 Parts by Weight |
| 5 micron Minusil | 15.14 Parts by Weight |
| Component G | 16.57 Parts by Weight |
| Degussa P-25 | 0.40 Parts by Weight |
| Catalyst 1 | 10.00 Parts by Weight |

Test results shown in Table VI below indicate that the formulations containing fumed titanium dioxide exhibit excellent tear strength properties.

TABLE VI

| Physical Properties | Sample 1 | Sample 2 |
|---|---|---|
| Brookfield Viscosity HBF 4 AT 10 RPM (cps) | 38,400 cps | 32,800 |
| SP. GR. | 1.16 | 1.14 |
| 10% Beta 1 Cure | | |
| Work life, minutes | 203 | 242 |
| Tack free time, minutes | 363 | 360 |
| Modified ASTM 2240* 24 hr. Shore A top | 9 | 8 |
| Modified ASTM 2240* 24 hr. Shore A bottom | 5 | 5 |
| 3 Day Properties | | |
| Shore A | 12 | 11 |
| Ave Tensile, psi | 375 | 361 |
| Ave Elong. % | 340 | 326 |
| Ave Die B Tear, pli | 81 | 84 |
| Tear 1 | 110 | 99 |
| Tear 2 | 109 | 123 |
| Tear 3 | 25 | 31 |

*¼" thick specimen using Shore A type A-2 durometer.

Although the present invention has been described in connection with preferred embodiments, it will be appreciated by those skilled in the art that additions, modifications, substitutions and deletions not specifically described may be made without departing from the spirit and scope of the invention defined in the appended claims.

What is claimed:

1. A curable silicone composition comprising from about 40 to about 80% by weight based on the entire silicone composition of a polymer system having a viscosity of between about 30,000 and 50,000 cps at 25° C. comprising:
   up to 50% by weight of the polymer system of Component (A), an organopolysiloxane fluid substantially free of silanol and having a viscosity of from about 20 to about 1,000 cps at 25° C. and up to 100% by weight of the polymer system of Component (B), a silanol chain-stopped organopolysiloxane, substantially free of silanol-on-chain and vinyl-on-chain, having a viscosity of from about 20,000 to about 150,000 cps at 25° C.;
   up to about 30% by weight based on the entire silicone composition of Component (C), a finely divided precipitated silica filler;
   between about 0.1 and about 15% by weight based on the entire silicone composition of an alkoxy silane crosslinker;
   between about 0.05 and about 25% by weight based on the entire silicone composition of at least one finely divided reinforcing co-filler selected from the group consisting of acicular $CaSiO_3$ fillers, spherical ceramic fillers, and fumed metal oxide fillers; and
   a catalytic amount of an addition catalyst.

2. A composition as defined in claim 1, wherein Component (C) has a surface area of between about 100 m²/gram to about 300 m²/gram.

3. A composition as defined in claim 1, wherein said crosslinking agent is an alkoxysilane crosslinking agent of the formula $(RO)_4Si$ wherein R is an alkyl radical.

4. A composition as defined in claim 3, wherein R is an n-propyl radical.

5. A composition as defined in claim 1, wherein Component (C) is present in an amount of between about 5 and 30% by weight based on the entire silicone composition.

6. A composition as defined in claim 5, wherein Component (C) has been pre-treated with hexamethyl disilazane.

7. A composition as defined in claim 1, wherein said reinforcing co-filler comprises fumed aluminum oxide and is present in an amount of between about 0.05 and about 25% by weight based on the entire silicone composition.

8. A composition as defined in claim 7, wherein said co-filler has an average particle size of about 20 nanometers.

9. A composition as defined in claim 1, wherein said reinforcing co-filler comprises a spherical silica-alumina ceramic filler and is present in an amount of between about 0.05 and about 10% by weight based on the entire silicone composition.

10. A composition as defined in claim 9, wherein said co-filler has an median particle diameter of between about 1.0 and 1.5 microns.

11. A composition as defined in claim 1, wherein said reinforcing co-filler has an acicular morphology, comprises calcium oxide and silica, and is present in an amount of between about 0.05 and about 25% by weight based on the entire silicone composition.

12. A composition as defined in claim 11, wherein said co-filler has an average particle size of about 3.0 microns.

13. A composition as defined in claim 1, wherein said reinforcing co-filler comprises fumed titanium dioxide.

14. A composition as defined in claim 1, further comprising:
   (D) a small amount of a silanol stopped siloxane fluid having a viscosity of about 3 to about 500 cps at 25° C.

15. A composition as defined in claim 14, wherein said fluid is a polydimethylsiloxane fluid.

16. A composition as defined in claim 1, wherein said reinforcing co-filler comprises fumed aluminum oxide and is present in an amount of between about 0.05 and about 10% by weight based on the entire silicone composition and said crosslinker comprises n-propylsilicate.

17. A two-part room temperature vulcanizable silicone compound comprising from about 40 to about 80% by weight based on the entire silicone composition of a polymer system comprising:
   up to 50% by weight of the polymer system of Component (A), an organopolysiloxane fluid substantially free of silanol and having a viscosity of from about 20 to about 1,000 cps at 25° C. and up to 100% by weight of the polymer system of Component (B), a silanol chain-stopped organopolysiloxane, substantially free of silanol-on-chain and vinyl-on-chain, having a viscosity of from about 20,000 to about 150,000 cps at 25° C.;
   up to about 30% by weight based on the entire silicone composition of Component (C), a finely divided precipitated silica filler;
   between about 0.1 and about 15% by weight based on the entire silicone composition of an alkoxy silane crosslinker;
   between 0.05 and about 25% by weight based on the entire silicone composition of at least one finely divided reinforcing co-filler selected from the group consisting of acicular $CaSiO_3$ fillers, spherical ceramic fillers, and fumed metal oxide fillers; and
   a catalytic amount of an additional catalyst,
   wherein Components (A) and (B) are in one part of the two-part system and the crosslinker and catalyst are in the other part of said two-part system.

18. A composition as defined in claim 17, wherein said crosslinking agent is an alkoxysilane crosslinking agent of the formula $(RO)_4Si$ wherein R is an alkyl radical.

19. A composition as defined in claim 18, wherein R is an n-propyl radical.

20. A composition as defined in claim 17, wherein said reinforcing co-filler comprises fumed aluminum oxide and is present in an amount of between about 0.05 and about 10% by weight based on the entire silicone composition and said crosslinker comprises n-propylsilicate.

21. A composition as defined in claim 17, wherein an amount of unreactive silicone oil is added to the part containing the crosslinker and catalyst to increase the volume of that part.

* * * * *